United States Patent
Masutani et al.

(10) Patent No.: US 7,733,446 B2
(45) Date of Patent: Jun. 8, 2010

(54) SEMITRANSMISSIVE LIQUID CRYSTAL DISPLAY DEVICE AND MANUFACTURING METHOD THEREOF

(75) Inventors: Yuichi Masutani, Kumamoto (JP); Shingo Nagano, Kumamoto (JP); Takuji Yoshida, Kumamoto (JP); Nobuaki Ishiga, Kumamoto (JP); Kazunori Inoue, Kumamoto (JP)

(73) Assignee: Mitsubishi Denki Kabushiki Kaisha, Chiyoda-Ku, Tokyo (JP)

(*) Notice: Subject to any disclaimer, the term of this patent is extended or adjusted under 35 U.S.C. 154(b) by 679 days.

(21) Appl. No.: 11/093,223

(22) Filed: Mar. 30, 2005

(65) Prior Publication Data
US 2005/0219451 A1   Oct. 6, 2005

(30) Foreign Application Priority Data
Apr. 2, 2004   (JP)   ............... 2004-110299

(51) Int. Cl.
G02F 1/136   (2006.01)
G02F 1/1335   (2006.01)
(52) U.S. Cl. ............... 349/114; 349/43; 349/113
(58) Field of Classification Search ......... 349/113–114, 349/43
See application file for complete search history.

(56) References Cited

U.S. PATENT DOCUMENTS

| 6,407,780 | B1* | 6/2002 | Sung ............... 349/43 |
| 6,861,368 | B2* | 3/2005 | Chae ............... 438/738 |
| 6,879,361 | B2* | 4/2005 | Moon et al. ............... 349/114 |
| 6,970,217 | B2* | 11/2005 | Lim et al. ............... 349/114 |
| 7,286,204 | B2* | 10/2007 | Yang et al. ............... 349/155 |
| 2003/0020856 | A1* | 1/2003 | Furuhashi et al. ............... 349/122 |
| 2003/0142255 | A1* | 7/2003 | Ishii et al. ............... 349/113 |
| 2003/0213966 | A1* | 11/2003 | Yang et al. ............... 257/93 |
| 2004/0227877 | A1* | 11/2004 | Jeong et al. ............... 349/114 |
| 2004/0227894 | A1* | 11/2004 | Kim et al. ............... 349/145 |

FOREIGN PATENT DOCUMENTS

| JP | 07-263700 | 10/1995 |
| JP | 2000-019563 | 1/2000 |
| JP | 2002-311445 | 10/2002 |
| JP | 2002-341366 | 11/2002 |
| JP | 2002-372721 | 12/2002 |
| JP | 2003-075854 | 3/2003 |
| JP | 2003-248232 | 9/2003 |

OTHER PUBLICATIONS

Japanese Office Action (with English language translation) dated Jun. 10, 2008.

* cited by examiner

*Primary Examiner*—Julie-Huyen L Ngo
(74) *Attorney, Agent, or Firm*—Buchanan Ingersoll & Rooney PC

(57) ABSTRACT

The present invention intends to provide a manufacturing method of a semi-transmissive liquid crystal display device in which method a structure and manufacturing process thereof are simplified to enable to reduce the manufacturing cost. In order to achieve the above object, a semi-transmissive liquid crystal display device in the invention has a layer constitution in which a reflective pixel electrode is formed with a second conductive film that constitutes a source electrode, a drain electrode, a source wiring and so on and on an upper layer of the second metal film a transmissive pixel electrode made of a transparent conductive film is formed through the insulating film. A TFT array substrate can be formed through 5 times of photoengraving process.

14 Claims, 9 Drawing Sheets

SEMITRANSMISSIVE LIQUID CRYSTAL DISPLAY DEVICE AND MANUFACTURING METHOD THEREOF

BACKGROUND OF THE INVENTION

1. Field of the Invention

The present invention relates to a semi-transmissive liquid crystal display device having, as a pixel electrode of a display device, in one pixel, a light transmissive pixel electrode that transmits light and a light reflective pixel electrode that reflects light, and a manufacturing method thereof.

2. Description of the Related Art

In an existing general liquid crystal display device, there are a transmissive liquid crystal display device in which a light source is disposed on a back surface or a side surface thereof to carry out image display and a reflective liquid crystal display device in which ambient light is reflected by a surface of a reflection plate formed on a substrate to carry out image display. In the transmissive liquid crystal display device, when ambient light is very bright, display light becomes darker in comparison with the ambient light; accordingly, the display cannot be observed. In order to make the display observable, the intensity of the light source has to be increased, resulting in a problem in that the power consumption increases. On the other hand, the reflective liquid crystal display device has a disadvantage in that when the ambient light is very dark, the visibility deteriorates very much. In order to overcome the problems, a liquid crystal display device (hereinafter, referred to as a semi-transmissive liquid crystal display device) that has, in one pixel, a light transmissive pixel electrode that transmits light and a light reflective pixel electrode that reflects light is proposed.

In an existing semi-transmissive liquid crystal display device, as a TFT array substrate that has, in one pixel, a light transmissive pixel electrode and a light reflective pixel electrode, a structure that includes a gate wiring that includes a gate electrode formed on a transparent insulating substrate; a source wiring that includes a source electrode intersecting through a first insulating film with the gate wiring; a thin film transistor (hereinafter, referred to as a TFT), as a switching element, which is made of a semiconductor layer formed through the first insulating film on the gate electrode, a source electrode and a drain electrode; an interlayer insulating film made of a second insulating film and an organic resin film that are formed above the TFT, the gate wiring and the source wiring; a transmissive pixel electrode made of a highly transparent conductive film electrically connected with a drain electrode of the TFT through a contact hole formed on the interlayer insulating film; and a reflective pixel electrode made of a highly reflective metal film formed without through the insulating film on the transmissive pixel electrode is disclosed (for example on pages 6-11 and FIG. 1 in JP-A-2003-248232).

SUMMARY OF THE INVENTION

According to the existing semi-transmissive liquid crystal display device disclosed in the above literature, in order to form a TFT array substrate having transmissive pixel electrodes and reflective pixel electrodes, a photoengraving process has to be repeated seven times. Alternatively, in order to reduce the number of times of the photoengraving process, a process of half-tone exposure becomes necessary. That is, since the number of the manufacturing processes is many, the manufacturing cost is made higher. Furthermore, there is another problem in that the organic resin film that is used as the interlayer insulating film is expensive in the material cost.

The present invention is achieved to overcome the above-mentioned problems and intends to simplify a structure and a manufacturing process of a semi-transmissive liquid crystal display device having, in one pixel, a light transmissive pixel electrode that transmits light and a light reflective pixel electrode that reflects light, and thereby to reduce the manufacturing cost.

A semi-transmissive liquid crystal display device according to the present invention includes, in a semi-transmissive liquid crystal display device that is constituted by disposing a liquid crystal between a TFT array substrate having, in one pixel, a light transmissive pixel electrode that transmits light and a light reflective pixel electrode that reflects light, and an opposite substrate having an opposite transparent electrode. The TFT array substrate including a gate wiring, a first insulating film, a source wiring, a thin film transistor and a second insulating film. The gate wiring that is made of a first conductive film formed on a transparent insulating substrate and includes a gate electrode. The first insulating film formed on the first conductive film. The source wiring made of a second conductive film that is formed on the first insulating film and intersects with the gate wiring and has a source electrode. The thin film transistor that is made of the gate electrode, and a semiconductor layer and the source electrode and a drain electrode formed through the first insulating film on the gate electrode. The second insulating film formed on the thin film transistor and the second conductive film. In the TFT array substrate, the reflective pixel electrode is formed from the second conductive film and extended from the drain electrode; and the second insulating film has an opening on the reflective pixel electrode, and through the opening the transmissive pixel electrode is electrically connected with the reflective pixel electrode.

Furthermore, a manufacturing method according to the invention of a semi-transmissive liquid crystal display device, in a manufacturing method of a semi-transmissive liquid crystal display device that includes a liquid crystal disposed between a TFT array substrate having, in one pixel, a light transmissive pixel electrode that transmits light and a light reflective pixel electrode that reflects light and an opposite substrate having an opposite transparent electrode. The manufacturing method of the TFT array substrate includes;

depositing a first conductive film on a transparent insulating substrate, followed by patterning to form a gate electrode and a gate wiring, sequentially depositing, on the first conductive film, a first insulating film, a semiconductor active film and an ohmic contact film, patterning the semiconductor active film and the ohmic contact film to form a semiconductor layer through the first insulating film on the gate electrode;

depositing, on the first insulating film and the semiconductor layer, a second conductive film, followed by patterning the second conductive film to form a source electrode, a drain electrode, a source wiring and a reflective pixel electrode;

depositing a second insulating film on the first insulating film and the second conductive film;

patterning the second insulating film to form an opening in the second insulating film on the reflective pixel electrode; and depositing a transparent conductive film on the second insulating film and in the opening, followed by patterning to form a transmissive pixel electrode electrically connected through the opening with the reflective pixel electrode.

According to the semi-transmissive liquid crystal display device and the manufacturing method thereof according to the invention, when the reflective pixel electrode excellent in the reflectance characteristics is formed from the second conductive film together with the source/drain electrode and the source wiring, and a constitution that does not use an organic resin film that is expensive in the material cost is adopted, a structure can be simplified and thereby the number of processes necessary to manufacture can be reduced, resulting in lowering the manufacturing cost of the semi-transmissive liquid crystal display device.

DESCRIPTION OF THE PREFERRED EMBODIMENTS

Figure 1:
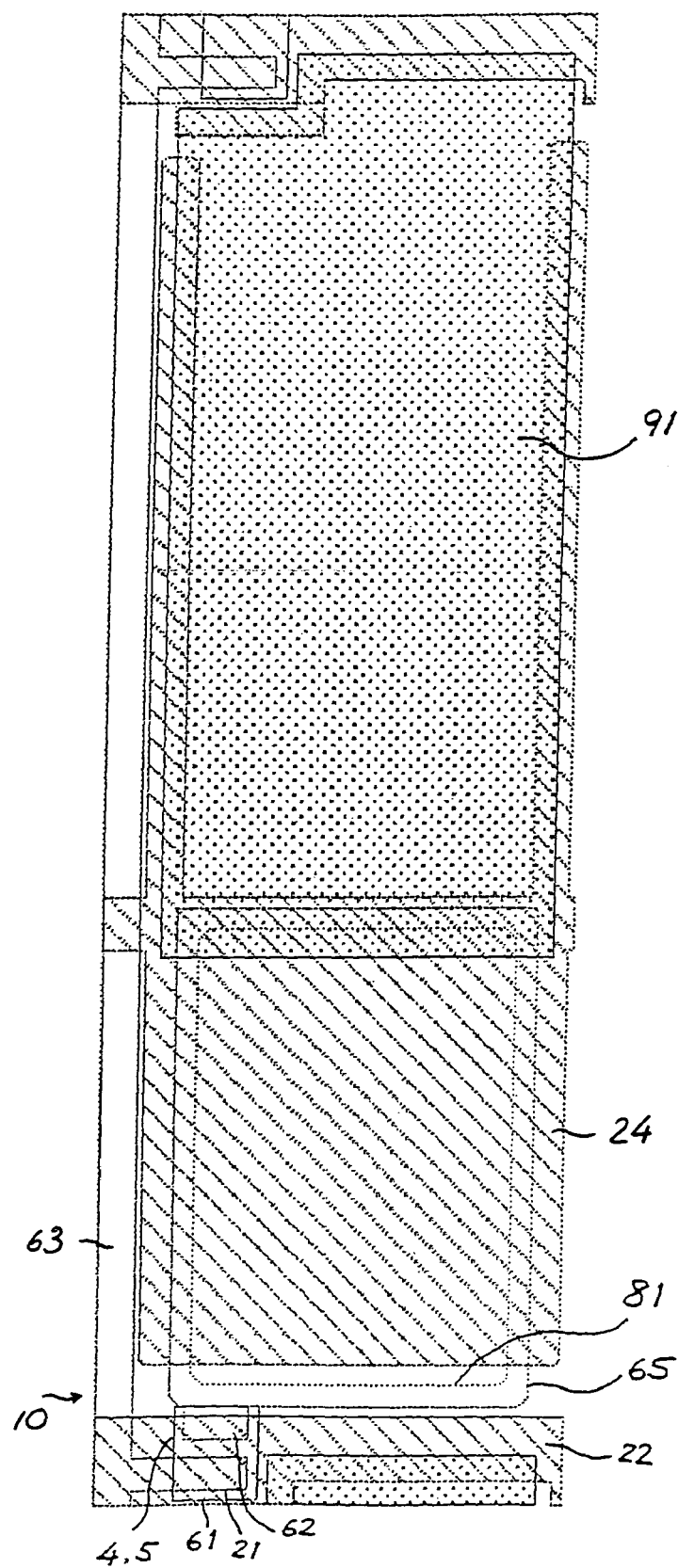
FIG. 1 is a plan view showing one pixel of a TFT array substrate that constitutes a semi-transmissive liquid crystal display device in embodiment 1 according to the present invention.
Figure 2:
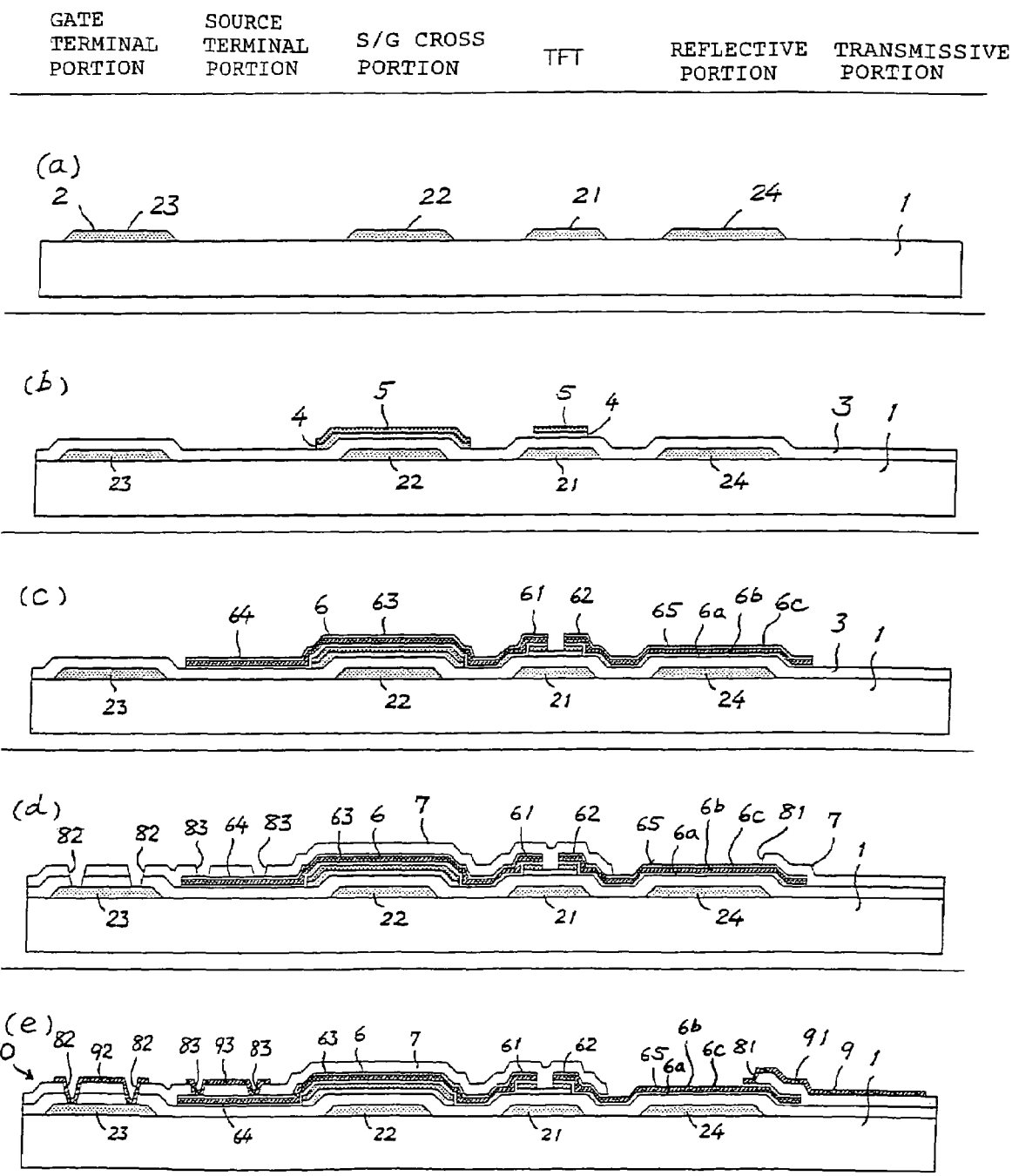
FIGS. 2A through 2E are sectional views showing a flow of manufacturing process of a TFT array substrate that constitutes a semi-transmissive liquid crystal display device in embodiment 1 according to the invention.

In what follows, embodiments 1 through 5 that are the best modes for carrying out the present invention will be described. In a semi-transmissive liquid crystal display device in the embodiments, a liquid crystal is disposed between a TFT array substrate having, in one pixel, a light transmissive pixel electrode that transmits light and a light reflective pixel electrode that reflects light and an opposite substrate having an opposite transparent electrode. In FIGS. 2 through 6, major portions of a TFT array substrate that constitutes a semi-transmissive liquid crystal display device, that is, from left in turn in the drawing, cross sections of a gate terminal portion, a source terminal portion, a gate/source intersection portion, a TFT portion, a reflective pixel electrode portion and a transmissive pixel electrode portion are continuously shown; however, actual dimensions and positional relationship of the respective portions are not shown correctly. For instance, the gate terminal portion and the source terminal portion are formed in a substrate end portion other than a display region.

Embodiment 1

FIG. 1 is a plan view showing one pixel of a TFT array substrate constituting a semi-transmissive liquid crystal display device in embodiment 1 according to the present invention, FIGS. 2A through 2E are sectional views showing a flow of manufacturing process of a TFT array substrate constituting a semi-transmissive liquid crystal display device in embodiment 1 similarly to FIG. 1. In the drawings, to the same portions and corresponding portions, the same reference numerals are given. Firstly, a structure of a TFT array substrate 10 in the present embodiment 1 will be explained with reference to FIG. 1 and FIG. 2E.

On a transparent insulating substrate 1 such as a glass substrate, a gate wiring 22 provided with a gate electrode 21, a gate terminal 23, an auxiliary capacitance electrode and an auxiliary capacitance wiring 24 that are all made of a first conductive film 2 are formed.

On the gate electrode 21, through a first insulating film (gate insulating film) 3, a semiconductor active film 4 that is a semiconductor film and an ohmic contact film 5 are formed. The ohmic contact film 5, removed in a center portion thereof, is divided in two regions. In one region thereof, a source electrode 61 made of the second conductive film 6 is stacked, and in the other region a drain electrode 62 similarly made of the second conductive film 6 is stacked. The semiconductor active film 4, the source electrode 61 and the drain electrode 62 constitute a TFT that is a switching element.

Furthermore, a source wiring 63 extended from the source electrode 61 is disposed so as to intersect through the first insulating film 3 with the gate wiring 22, and a source electrode 64 is formed as well with the second conductive film 6. At an intersection portion of the gate wiring 22 and the source wiring 63, in order to improve the withstand voltage of the intersection portion, the semiconductor active film 4 and the ohmic contact film 5 are left.

Still furthermore, a reflective pixel electrode 65 is extended and formed from the drain electrode 62. That is, the reflective pixel electrode 65 is formed with the second conductive film 6; accordingly, as the second conductive film 6, at least a thin film having a metal film high in the reflectance at a surface layer thereof is used. When the reflective pixel electrode 65 is formed through the first insulating film 3 superposed on the auxiliary capacitance electrode and auxiliary capacitance wiring 24, an auxiliary capacitance is formed at the liquid crystal drive to result in excellent display, and a portion that cannot be utilized as a transmissive region owing to the formation of the auxiliary capacitance electrode and auxiliary capacitance wiring 24 can be utilized as a reflective region; accordingly, the aperture ratio can be preferably improved.

A second insulating film 7 is formed so as to cover the above constituents, and the second insulating film 7 on the reflective pixel electrode 65 is removed in an almost entire surface thereof and thereby an opening 81 is formed. Furthermore, in the first insulating film 3 and the second insulating film 7 on a gate terminal 23 and in the second insulating film 7 on the source terminal 64, contact holes 82 and 83 are formed, respectively.

A transmissive pixel electrode 91 made of a conductive film 9 high in the transmittance (hereinafter, referred to as transparent conductive film) is formed on the second insulating film 7, and the transmissive pixel electrode 91 is electrically connected through an opening 81 with the reflective pixel electrode 65 and further electrically connected through the reflective pixel electrode 65 with the drain electrode 62. The reflective pixel electrode 65 and transmissive pixel electrode 91, owing to a voltage that is applied between the TFT array substrate 10 and an opposite transparent electrode formed on an opposite substrate oppositely disposed to the TFT array substrate 10, control orientation of the liquid crystal.

Furthermore, the transparent conductive film covers the insides of the contact holes 82 and 83 on the gate terminal 23 and the source terminal 64, and terminal patterns 92 and 93 are formed on the second insulating film 7. The terminal pattern 92 is electrically connected through the contact hole 81 with the gate terminal 23, the terminal pattern 93 is electrically connected through the contact hole 82 with the source terminal 64, and through the terminal patterns 92 and 93 a signal is inputted from a driving circuit to the gate wiring 22 or the source wiring 63.

In the next place, a manufacturing process of the semi-transmissive liquid crystal display device in the embodiment 1 will be described with reference to FIGS. 2A through 2E.

Firstly, after a transparent insulating substrate 1 such as a glass substrate is washed to cleanse a surface thereof, a first conductive film 2 is deposited on the transparent insulating substrate 1 by means of sputtering or the like. As the first conductive film 2, a thin film made of, for instance, chromium (Cr), molybdenum (Mo), tantalum (Ta), titanium (Ti) or an alloy mainly made of these is used. In the present embodiment, as the first conductive film 2, a chromium film having a film thickness of 400 nm is deposited.

On the first conductive film 2, the contact hole 81 is formed by means of dry etching according to a process described later, and in the contact hole 81 a conductive thin film (transparent conductive film) 9 for obtaining electrical connection is formed. Accordingly, a metal thin film that is hardly surface oxidized or a metal thin film that remains electrically conductive even after the oxidation is preferably used as the first conductive film 2.

Subsequently, the first conductive film 2 is patterned in a first photoengraving step to form, as shown in FIG. 2A, a gate terminal 23, a gate wiring 22, a gate electrode 21, an auxiliary capacitance electrode and auxiliary capacitance wiring 24. In the photoengraving step, after a substrate is cleansed, a photosensitive resist is coated and dried, followed by exposing with a mask provided with a predetermined pattern and developing to form a mask pattern-transferred resist on the substrate, after the photosensitive resist is heated and hardened, the first conductive film 2 is etched, followed by peeling the photosensitive resist.

The first conductive film 2 can be etched with a known etchant according to wet etching. For instance, when the first conductive film 2 is made of chromium, an aqueous solution in which cerium nitrate ammonium and nitric acid are blended is used. Furthermore, when the first conductive film 2 is etched, in order to improve the coverage of the insulating film at a step portion of a pattern edge to inhibit the short-circuiting with other wiring from occurring at a step portion, taper etching is preferably applied so that a cross section of the pattern edge may be a trapezoidal taper shape.

In the next place, by means of the plasma CVD or the like, a first insulating film 3, a semiconductor active film 4 and an ohmic contact film 5 are consecutively deposited. As the first insulating film 3 that becomes a gate insulating film, a single layer film of any one of a SiNx film, SiOy film and SiOzNw film (x, y, z and w, respectively, are positive integers expressing a chemical stoichiometric composition) or a multi-layered film obtained by laminating these films is used. A film thickness of the first insulating film 3, since when it is thinner the short-circuiting tends to occur at an intersection portion of a gate wiring 2b and a source wiring 6c and when it is thicker an ON current of the TFT becomes smaller to result in the deterioration of the display characteristics, is preferable to be substantially a thickness of the first conductive film 2 or more and thin as far as possible. Furthermore, the insulating film, in order to inhibit the interlayer short-circuiting from occurring owing to the generation of pin holes and so on, is preferably deposited in a plurality of times for the film formation. In the embodiment, after a SiN film having a film thickness of 300 nm is deposited, a SiN film having a film thickness of 100 nm is further deposited, and thereby an a-Si film having a film thickness of 400 nm is formed as the first insulating film 3.

As the semiconductor active film 4, an amorphous silicon (a-Si) film, polysilicon (p-Si) film or the like is used. A film thickness of the semiconductor active film 4, since when it is thinner the film disappears at the time of dry etching of an ohmic contact film 5 described later and when it is thicker an ON current of the TFT becomes small, is selected in consideration of the controllability of an etching amount at the dry etching of the ohmic contact film 5 and a necessary ON current value of the TFT. In the embodiment, as the semiconductor active film 4, an a-Si film having a film thickness of 150 nm is deposited.

As the ohmic contact film 5, an n-type a-Si film in which a slight amount of phosphorus (P) is doped in a-Si or an n-type p-Si film is used. In the embodiment, as the ohmic contact film 5, an n-type a-Si film having a film thickness of 30 nm is deposited.

Subsequently, in a second photoengraving step, as shown in FIG. 2B, the semiconductor active film 4 and the ohmic contact film 5 are patterned so as to remain at least on a portion where a TFT portion is formed. When the semiconductor active film 4 and the ohmic contact film 5 are left also in a portion where the gate wiring 22 intersects with the source wiring 63, the withstand voltage at the intersection can be preferably made larger. The semiconductor active film 4 and the ohmic contact film 5 are etched according to a dry etching method with a known gas composition (such as a mixture gas of $SF_6$ and $O_2$ or a mixture gas of $CF_4$ and $O_2$).

Then, a second conductive film 6 is deposited by means of the sputtering or the like. As the second conductive film 6, a thin film having a three-layered structure is used. In the thin film, a first layer 6a is formed from, for instance, chromium, molybdenum, tantalum, titanium or an alloy mainly made of at least these one, a second layer 6b is formed of aluminum, silver (Ag) or an alloy mainly made of at least these one and a third layer 6c is made of a nitride film of aluminum, silver (Ag) or an alloy mainly made of at least these one. The first layer 6a is deposited on the ohmic contact layer 5 and the first insulating film 3 so as to directly come into contact with these. The second layer 6b is deposited on the first layer 6a so as to directly come into contact therewith. The third layer 6c is deposited superposingly on the second layer 6b so as to directly come into contact therewith. The second conductive film 6 is used as the source wiring 63 and the reflective pixel electrode 65; accordingly, it is necessary to constitute the second conductive film 6 by considering the wiring resistance and the reflectance characteristics of a surface layer. In the embodiment, as the first layer 6a of the second conductive film 6a chromium film having a film thickness of 100 nm is deposited; as the second layer 6b thereof, an AlNd film having a film thickness of 300 nm; and as the third layer 6c thereof, an AlNdN film having a film thickness of 30 nm. The third layer 6c, in the embodiment 1, is deposited as a surface layer.

The first layer 6a of the second conductive film 6 is disposed so as to improve the adhesiveness with the first insulating film 3. The second conductive film 6 is exposed to a sputtering atmosphere in a transparent conductive film deposition step described later. Accordingly, as the uppermost third layer 6c of the second conductive film 6, a conductive metal thin film that is hardly surface oxidized even when it is exposed to the sputtering atmosphere is preferably used. Thereby, the contact resistance between the second conductive film 6 and the transparent conductive film 9 can be inhibited from becoming higher.

Figure 3:
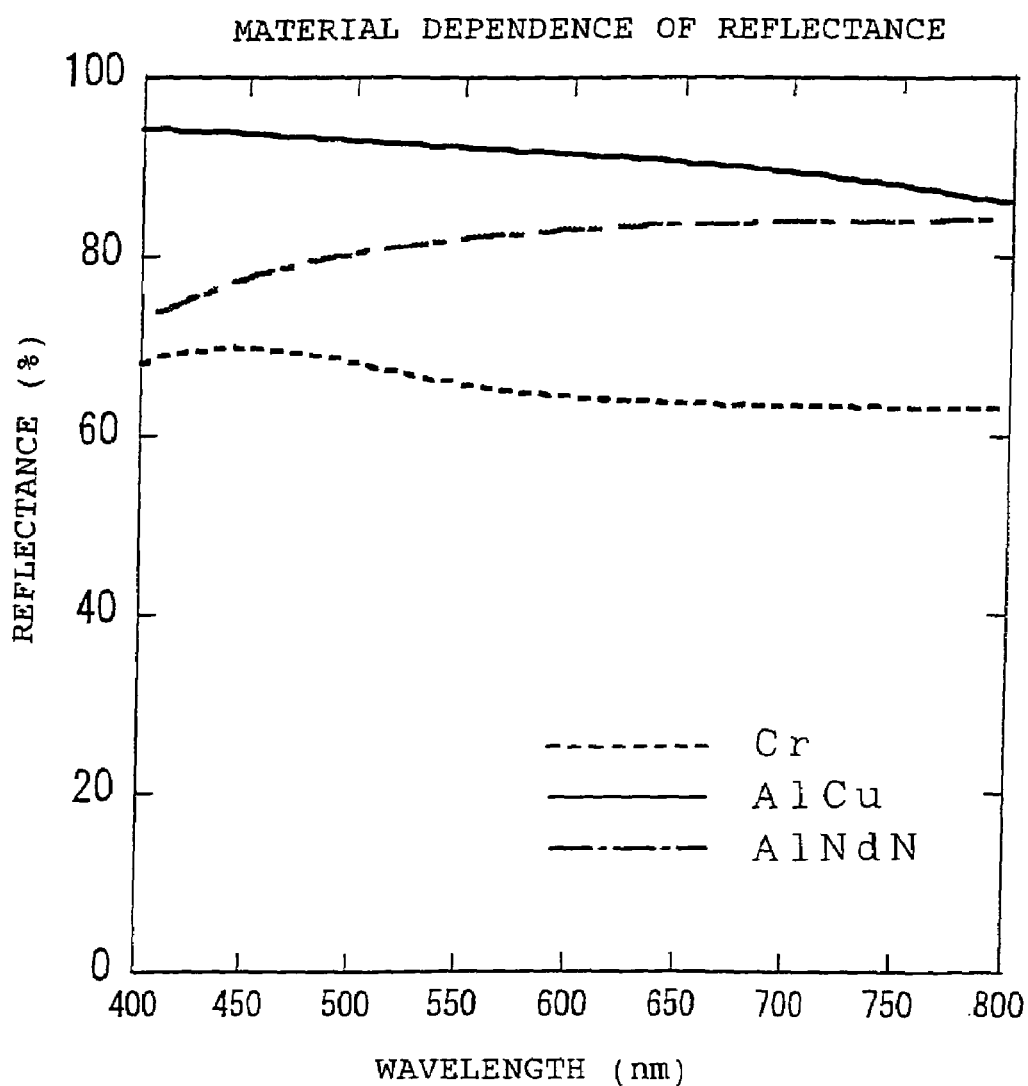
FIG. 3 is a diagram showing the reflectance in the respective wavelengths of various kinds of metal materials.

In FIG. 3, with the reflectance (%) in a vertical axis and a wavelength (nm) of light in a horizontal axis, the material dependency of the reflectance of the reflective pixel electrode 65 is shown. In FIG. 3, the characteristics shown with a dotted line show the reflectance of chromium, Cr; that shown with a bold solid line, the reflectance of aluminum/copper, AlCu; and that shown with a fine solid line, the reflectance of aluminum-based nitride, AlNdN. As shown in the FIG. 3, when an Al-based nitride such as AlNdN is used as the third layer (surface layer) 6c of the second conductive film, in comparison with a case where a refractory metal such as Cr that is not surface oxidized even when it is exposed to the sputtering atmosphere, the reflectance characteristics as the reflective pixel electrode can be improved; accordingly, in the third layer 6c, the Al-based nitride like this can be preferably used.

In the next place, in a third photoengraving step, the second conductive film 6 is patterned to form a source terminal 64, a source wiring 63, a source electrode 61, a drain electrode 62 and a reflective pixel electrode 65. At that time, the drain electrode 62 and the reflective pixel electrode 65 are continuously formed in the same layer, that is, the drain electrode 62 and the reflective pixel electrode 65 are electrically connected in the same layer. The second conductive film 6 can be etched with a known etchant according to the wet etching.

Subsequently, a center portion of the ohmic contact film 5 of the TFT portion is etched and removed to expose the semiconductor active film 4 as shown in FIG. 2C. The ohmic contact film 5 can be etched with a known gas composition (such as a mixture gas of $SF_6$ and $O_2$ or a mixture gas of $CF_4$ and $O_2$) according to a dry etching method.

In the next place, a second insulating film 7 is deposited by means of the plasma CVD or the like. The second insulating film 7 can be formed from a material same as that of the first insulating film 3, and a film thickness thereof is preferably determined in consideration of the coverage of a lower layer pattern. In the embodiment, as the second insulating film 7, a SiN film having a film thickness of 500 nm is deposited.

Then, in a fourth photoengraving step, the second insulating film 7 and the first insulating film 3 are patterned to form, as shown in FIG. 2D, an opening 81 on the reflective pixel electrode 65, a contact hole 82 on the gate terminal 64 and a contact hole 83 on the source terminal 64. The first insulating film 3 and the second insulating film 7 on the gate terminal 23 are etched at one time to form a contact hole 82. The first insulating film 3 and the second insulating film 7 can be etched with a known etchant according to the wet etching, or with a known gas composition according to the dry etching. Furthermore, in the etching of the first insulating film 3 and the second insulating film 7, in order to improve the coverage of the conductive thin film in the contact holes 82 and 83, taper etching is preferably applied.

At this point of time, as shown in FIG. 2D, the gate terminal 23 is exposed owing to the contact hole 82 and the source terminal 64 is exposed owing to the contact hole 83. Furthermore, owing to the opening 81, a substantially whole surface of the reflective pixel electrode 65 is exposed.

In the next place, a transparent conductive film 9 is deposited by means of the sputtering or the like. As the transparent conductive film 9, ITO, $SnO_2$ and so on can be used. From the viewpoint of the chemical stability in particular, the ITO is preferably used. As the ITO, any of crystalline ITO and amorphous ITO (a-ITO) can be used; however, when the a-ITO is used, after the patterning, it is necessary to crystallize by heating to a crystallization temperature, 180 degrees centigrade, or more. In the embodiment, as the transparent conductive film 9, a-ITO having a film thickness of 80 nm is deposited.

Then, in a fifth photoengraving step, the transparent conductive film 9 is patterned to form, as shown in FIG. 2E, a transmissive pixel electrode 91 and terminal patterns 92 and 93. At this time, the insides of the contact holes 82 and 83 and a sidewall portion of the opening 81 that corresponds to a connection portion of the reflective pixel electrode 65 and the transmissive pixel electrode 91 are covered with the transparent conductive film 9. Furthermore, when as the third layer 6c at the uppermost of the second conductive film 6 that constitutes the reflective pixel electrode 65 and so on, a conductive metal thin film made of Al-based nitride that is hardly surface oxidized even when it is exposed to the sputtering atmosphere is used, the reflective pixel electrode 65 and the transmissive pixel electrode 91 can obtain excellent contact resistance and the transmissive pixel electrode 91 is electrically connected through the reflective pixel electrode 65 with the drain electrode 62.

Furthermore, the terminal pattern 92 is electrically connected through the contact hole 82 with the gate terminal 23 and the terminal pattern 93 is electrically connected through the contact hole 83 with the gate terminal 64. The transparent conductive film 9 can be etched, depending on a material that is used, with a known etchant or a known gas composition. Furthermore, after the transparent conductive film 9 is etched and the photosensitive resist is peeled, a-ITO is heated at 180 degrees centigrade or more in air to crystallize. After undergoing the above steps, as shown in FIG. 2E, a TFT array substrate 10 having, in one pixel, a reflective pixel electrode 65 and a transmissive pixel electrode 91 can be formed after 5 times of photoengraving steps.

The TFT array substrate 10 thus formed, in the following cell formation process, is coated with an orientation film, followed by rubbing in a constant direction. Similarly, also on an opposite substrate in which on another transparent insulating substrate a black matrix, a color filter, a protective film of the color filter and an opposite transparent electrode are formed, an orientation film is coated and the rubbing is applied. The TFT array substrate 10 and the opposite substrate are superposed through a spacer so that the respective orientation films may face each other, and peripheral portions of the substrates are adhered with a sealing material, followed by filling in a liquid crystal between both substrates. On a back surface of a liquid crystal cell thus formed, a backlight unit is attached, and thereby a semi-transmissive liquid crystal display device in the embodiment 1 comes to completion.

As mentioned above, in the semi-transmissive liquid crystal display device in the embodiment 1, the reflective pixel electrode 65 is formed of the second conductive film 6 that constitutes the source electrode 61, the drain electrode 62, the source wiring 63 and so on, and a constitution that does without the interlayer insulating film made of an organic resin film high in the material cost is adopted. Accordingly, a structure of the semi-transmissive liquid crystal display device can be simplified and the number of steps necessary for manufacture can be reduced, resulting in reducing the manufacturing cost of the semi-transmissive liquid crystal display device.

Furthermore, when, as the third layer (surface layer) 6c of the second conductive film 6 that constitutes the reflective pixel electrode 65, a conductive metal thin film that is excellent in the reflection characteristics and hardly surface oxidized even when it is exposed to the sputtering atmosphere is used, also in the present constitution where, after the reflective pixel electrode 65 is formed, the transmissive pixel electrode 91 is formed and the transmissive pixel electrode 91 is electrically connected through the reflective pixel electrode 65 to the drain electrode 62, the reflective pixel electrode 65 has excellent reflection characteristics and a connection portion of the reflective pixel electrode 65 and the-transmissive pixel electrode 91 can obtain excellent contact resistance.

Furthermore, the reflective pixel electrode 65 becomes, owing to the opening 81, a structure exposed on a surface of the TFT array substrate 10; accordingly, excellent reflection characteristics can be obtained.

Embodiment 2

Figure 4:
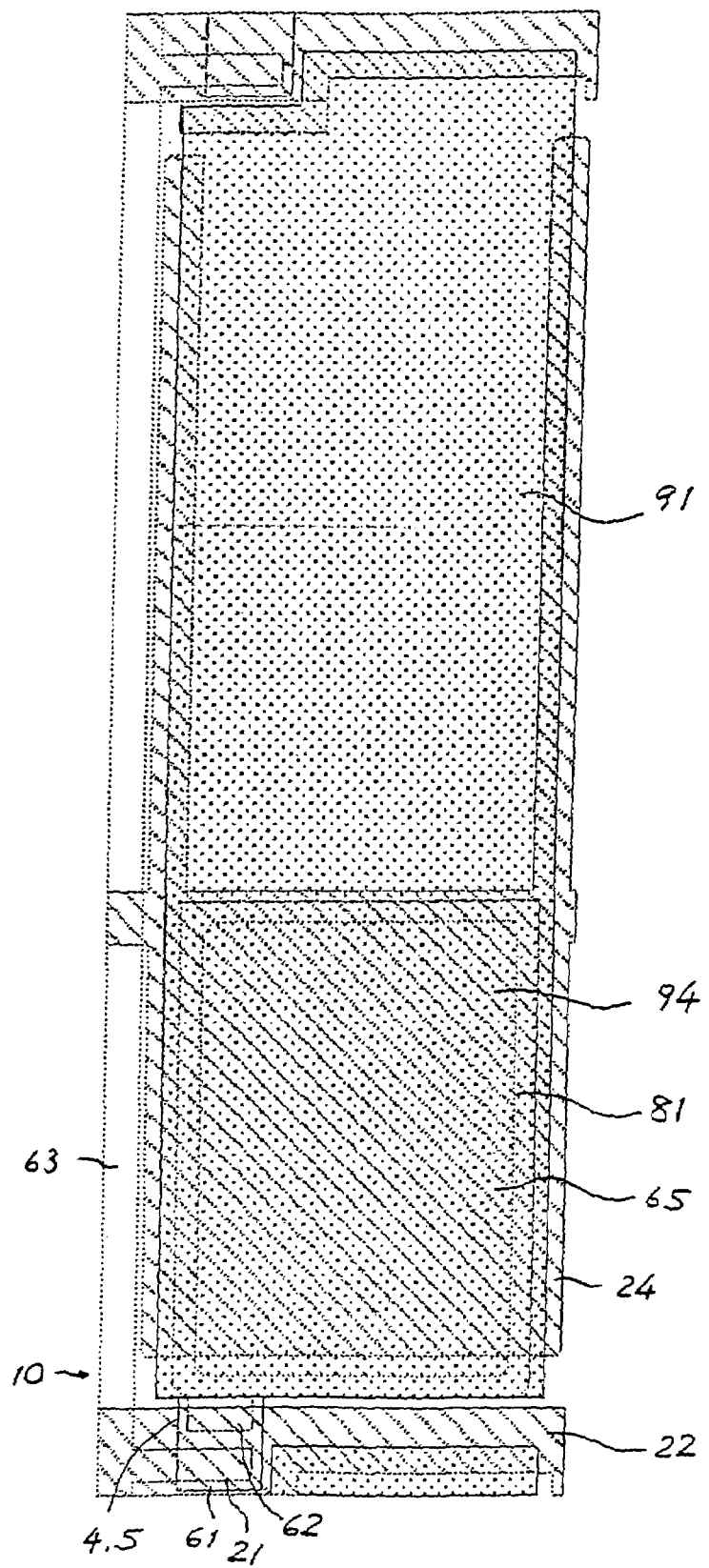
FIG. 4 is a plan view showing one pixel of a TFT array substrate that constitutes a semi-transmissive liquid crystal display device in embodiment 2 according to the invention.
Figure 5:
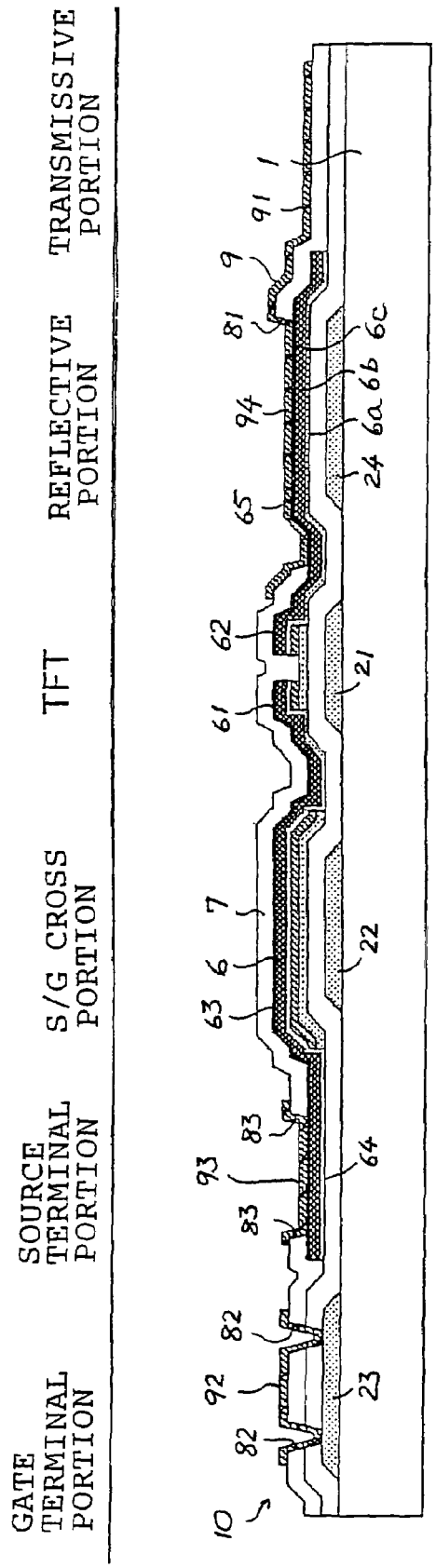
FIG. 5 is a sectional view showing a TFT array substrate that constitutes a semi-transmissive liquid crystal display device in embodiment 2 according to the invention.

FIG. 4 is a plan view showing one pixel of a TFT array substrate that constitutes a semi-transmissive liquid crystal display device in embodiment 2 according to the invention, FIG. 5 being, similarly to FIG. 4, a sectional view showing a TFT array substrate that constitutes a semi-transmissive liquid crystal display device in embodiment 2 according to the invention. In the drawings, the same and corresponding portions are given the same reference numerals.

A structure of a semi-transmissive liquid crystal display device and a manufacturing process thereof in the present embodiment are, except for a formation region of a transmissive pixel electrode 91 that is formed on a TFT array substrate 10, similar to that of the embodiment 1; accordingly, explanations thereof will be omitted.

A TFT array substrate 10 in the embodiment 2 is provided with, similarly to the embodiment 1, on a transparent insulating substrate 1, a gate electrode 21 and a gate wiring 22 and a gate terminal 23 and auxiliary capacitance electrode and auxiliary capacitance wiring 24 that are all made of a first conductive film 2, a first insulating film 3, a semiconductor active film 4, an ohmic contact film 5, a source electrode 61 and a drain electrode 62 and a source wiring 63 and a source terminal 64 and a reflective pixel electrode 65 that are all formed of a second conductive film 6; on a second insulating film 7 and the reflective pixel electrode 65, an opening 81; on the gate terminal 23, a contact hole 82; and on the source terminal 64, a contact hole 83, terminal patterns 92, 93 and a transmissive pixel electrode 91. However, in the embodiment 2, as shown in FIGS. 4 and 5, a transparent conductive film 9 has a covering portion 94 of the reflective pixel electrode 65 continuous with the transmissive pixel electrode 91, and the covering portion 94 covers the whole of an opening 81 formed in the second insulating film 7 on the reflective pixel electrode 65 and the whole of the reflective pixel electrode 65 exposed from the opening 81 and is connected through the opening 81 to the transmissive pixel electrode 91.

So far, in a reflective liquid crystal display device, there is a problem in that a display flickering phenomenon is caused. The problem is handled, in an inspection step of the liquid crystal display device, by controlling a potential of a reflective pixel electrode or an opposite transparent electrode. The display flickering phenomenon is considered to be occurred because aluminum or silver that is used in the reflective pixel electrode on a TFT array substrate side and ITO that is used in the opposite transparent electrode on an opposite substrate side are different in the work function. That is, this is because, when the work functions of metals that constitute electrodes are different, magnitudes of interfacial polarization generated at contact interfaces between electrodes and an orientation film are different, as a result, on the TFT array substrate side and the opposite substrate side, amounts of polarization at interfaces of the electrodes and the orientation film are different, and thereby a DC component is superposed on a liquid crystal layer.

In the embodiment 2, when the reflective pixel electrode 65 is covered with the covering portion 94 of the transmissive conductive film 9 made of ITO, on the reflective pixel electrode 65, films made of the same material (ITO) as the opposite transparent electrode face each other, and on the TFT array substrate 10 side and the opposite substrate side, the conductive films that come into contact with the orientation film become the same material. As a result, at an interface between the conductive film covering portion 94 on the TFT array substrate 1 side and the orientation film and at an interface between a conductive film (ITO of the opposite transparent electrode) on the opposite substrate side and the orientation film, amounts of polarization become same; accordingly, a DC component does not superpose on a liquid crystal layer.

As mentioned above, in the embodiment 2 as well, similarly to the embodiment 1, when a configuration in which the reflective pixel electrode 65 is formed with the second conductive film 6 that constitutes the source electrode 61, drain electrode 62 and source wiring 63 and that does not use the interlayer insulating film that is made of an organic resin film high in the material cost is adopted, the manufacturing cost of the semi-transmissive liquid crystal display device can be reduced. Furthermore, when, as the third layer (surface layer) 6c of the second conductive film 6 that constitutes the reflective pixel electrode 65, the conductive metal thin film that is not likely to be surface oxidized even when it is exposed to the sputtering environment is used, also in a layer structure that forms the transmissive pixel electrode 91 after the formation of the reflective pixel electrode 65, a connection portion between the reflective pixel electrode 65 and the transmissive pixel electrode 91 can obtain excellent contact resistance.

Furthermore, when the reflective pixel electrode 65 is covered with the covering portion 94 of the transmissive conductive film 9, without adding a process, the display flickering phenomenon can be inhibited from occurring, resulting in obtaining a semi-transmissive liquid crystal display device high in display quality.

Embodiment 3

Figure 6:
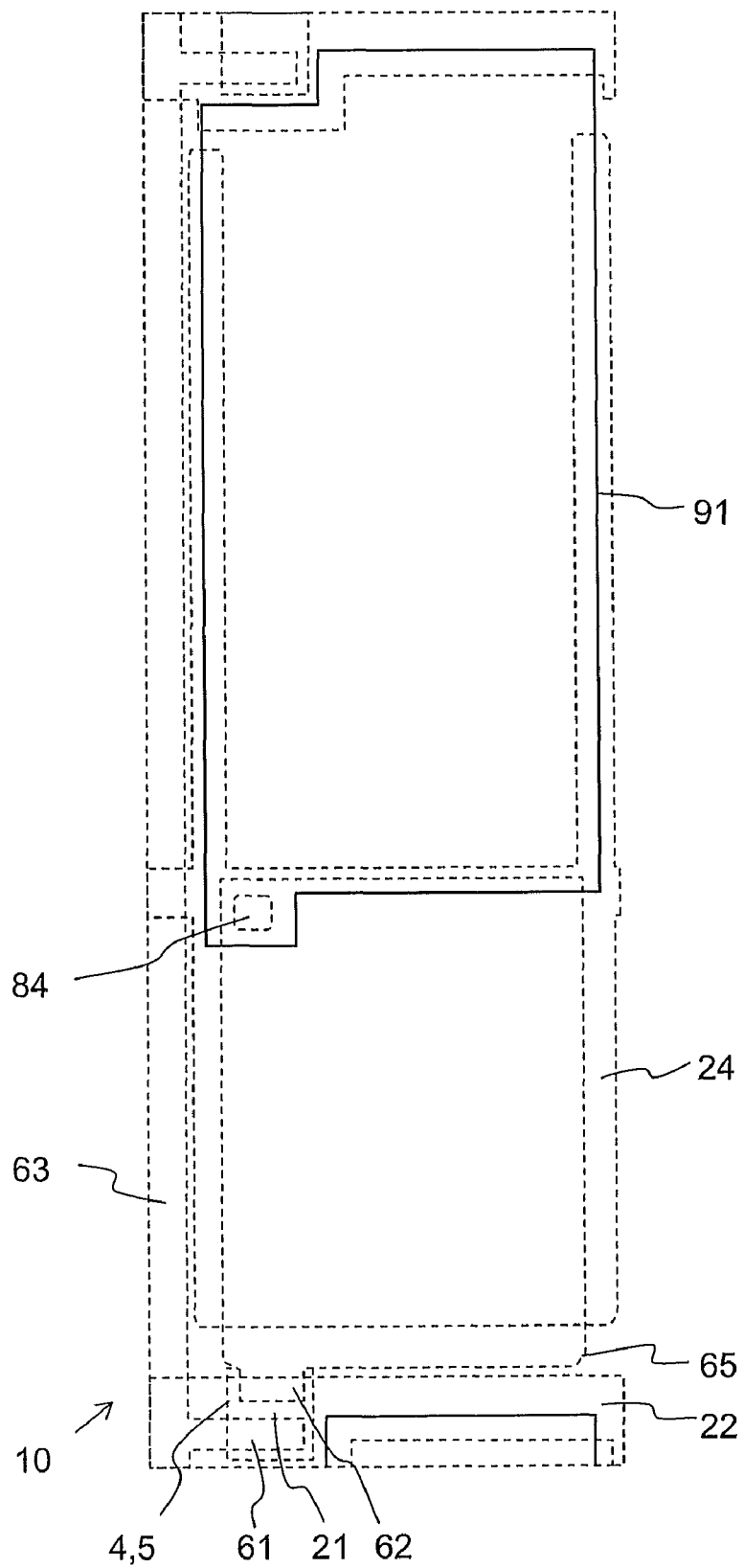
FIG. 6 is a plan view showing one pixel of a TFT array substrate that constitutes a semi-transmissive liquid crystal display device in embodiment 3 according to the invention.

FIG. 6 is a plan view showing one pixel of a TFT array substrate constituting a semi-transmissive liquid crystal display device in embodiment 3 according to the present invention. FIGS. 7A through 7E are sectional views showing a flow of manufacturing process of the TFT array substrate constituting a semi-transmissive liquid crystal display device in embodiment 3 according to the present invention. In the drawings, the same and corresponding portions are given the same reference numerals. Firstly, a structure of a TFT array substrate in the embodiment 3 will be described with reference to FIGS. 6 and 7E.

In a TFT array substrate 10 according to the embodiment 3, a second conductive film 6 is formed into a two-layered structure in which a second layer 6b is formed on a first layer 6a, the second layer 6b constitutes a surface layer, and, different from the second conductive film 6 in the embodiments 1 and 2, a third layer 6c is not formed. The reflective pixel electrode 65 is almost entirely covered with a covering portion 71 of a second insulating film 7 and a transmissive pixel electrode 91 and the reflective pixel electrode 65 are electrically connected through a contact hole 84 formed in the covering portion 71 of the second insulating film 7 on the reflective pixel electrode 65. Furthermore, in a connection portion of the second conductive film (such as the reflective pixel electrode 65) 6 and a transparent conductive film (such as transmissive pixel electrode 91) 9, the second layer 6b of the second metal film 6 is removed, and, owing to the first layer (Cr) 6a that is not surface oxidized, the reflective pixel electrode 65 and the transmissive pixel electrode 91 are connected. The structure other than the above is similar to the embodiment 1; accordingly, explanations thereof will be omitted.

Figure 7:
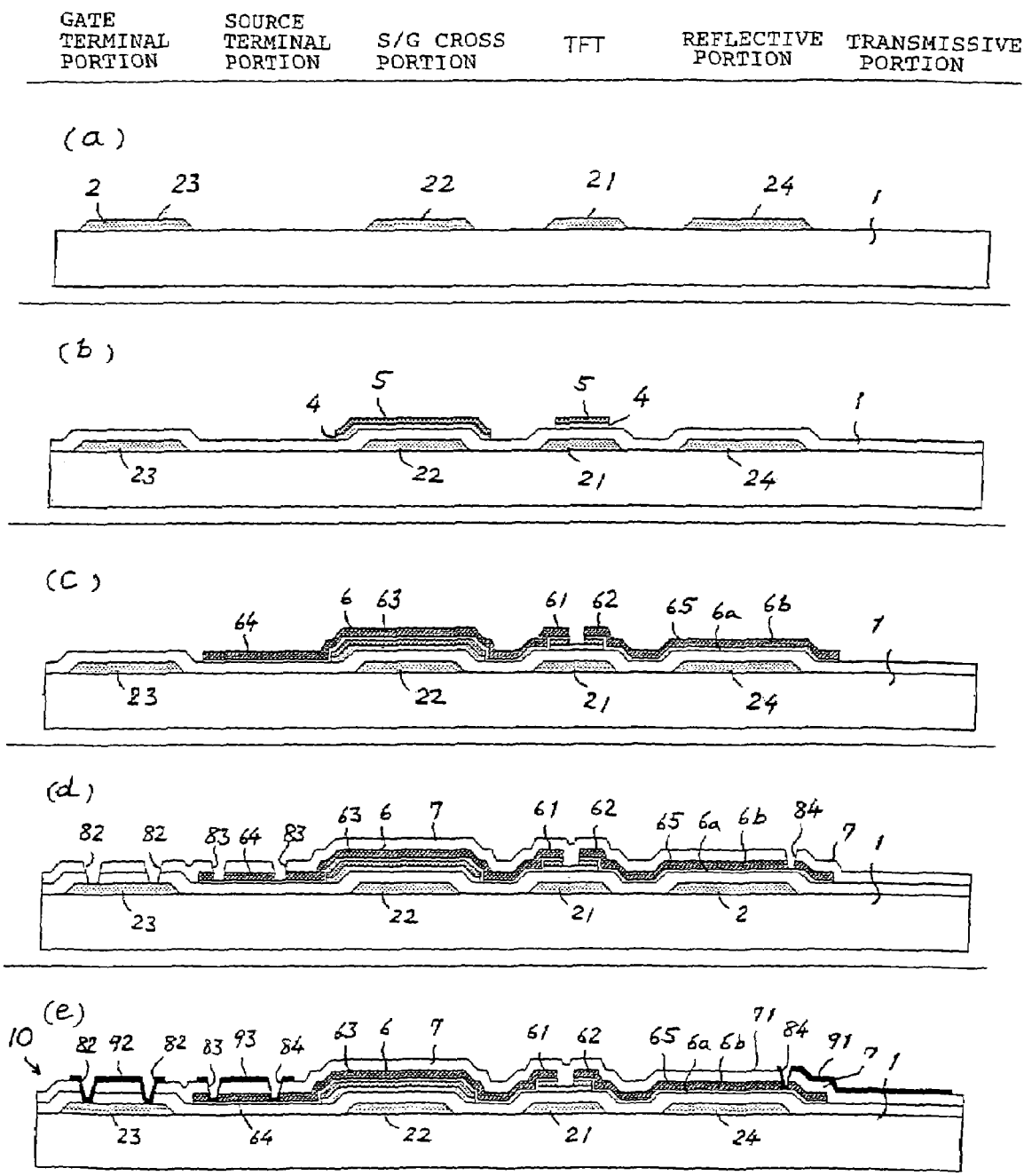
FIGS. 7A through 7E are sectional views showing a flow of manufacturing process of a TFT array substrate that constitutes a semi-transmissive liquid crystal display device in embodiment 3 according to the invention.

In the next place, a manufacturing process of the semi-transmissive liquid crystal display device in the embodiment 3 will be explained with reference to FIGS. 7A through 7E. Firstly, on a transparent insulating substrate 1, a first conductive film 2 is deposited, followed by patterning in a first photoengraving process to form a gate terminal 23, a gate wiring 22, a gate electrode 21, and auxiliary capacitance electrode and auxiliary capacitance wiring 24 (FIG. 7A). Film compositions and manufacturing processes of the gate electrode 21, the gate wiring 22, the gate terminal 23 and the auxiliary capacitance wiring 24 are similar to that of the embodiment 1; accordingly, explanations thereof will be omitted.

In the next place, a first insulating film 3, a semiconductor active film 4, and an ohmic contact film 5 are successively deposited, followed by patterning the semiconductor active film 4 and the ohmic contact film 5 in the second photoengraving process (FIG. 7B). Film compositions and manufacturing processes of the first insulating film 3, the semiconductor active film 4, and the ohmic contact film 5 are similar to that of the embodiment 1; accordingly, explanations thereof will be omitted.

Subsequently, by use of the sputtering method or the like, a second conductive film 6 is deposited. As the second conductive film 6, a thin film having a two-layered structure in which, for instance, a first layer 6a is formed from chromium, molybdenum, tantalum, titanium or an alloy mainly made of at least these one, and a second layer 6b is formed of aluminum, silver (Ag) or an alloy mainly made of at least these one can be used. The first layer 6a is deposited on the ohmic contact layer 5 and the first insulating film 3 so as to directly come into contact with these. The second layer 6b is deposited superposed on the first layer 6a so as to directly come into contact therewith. In the embodiment 3, the second layer 6b is a surface layer of the second conductive layer 6. The second conductive film 6 is used as the source wiring 63 and the reflective pixel electrode 65; accordingly, these are necessary to be constituted by considering the wiring resistance and the reflection characteristics of a surface layer. In the embodiment 3, as the first layer 6a of the second conductive film 6 a chromium film having a film thickness of 100 nm is deposited; and as the second layer 6b, an AlCu film having a film thickness of 300 nm is deposited.

In the embodiment 3, at a connection portion of the second conductive film (such as reflective pixel electrode 65) 6 and the transparent conductive film (such as transmissive pixel electrode 91) 9, the second layer 6b of the second conductive film 6 is partially removed and the first layer 6a is used to electrically connect with the transparent conductive film 91; accordingly, as the first layer 6a of the second conductive film 6, a metal thin film that is excellent in the adhesiveness with the first insulating film 3 and hardly surface oxidized even when it is exposed to the sputtering atmosphere in a process of forming a transparent conductive film described later is used. The second conductive film 6 and the transparent conductive film 9 are connected through the first layer 6a of the second conductive film 6; accordingly, on a surface layer (uppermost layer) of the second conductive film 6, a metal thin film that is hardly surface oxidized even when it is exposed to the sputtering atmosphere is not necessary to be disposed, that is, a layer structure can be made into a two-layer structure.

In the next place, in a third photoengraving step, the second conductive film 6 is patterned to form a source terminal 64, a source wiring 63, a source electrode 61, a drain electrode 62 and a reflective pixel electrode 65. At that time, the drain electrode 62 and the reflective pixel electrode 65 are continuously formed in the same layer, that is, the drain electrode 62 and the reflective pixel electrode 65 are electrically connected in the same layer. The second conductive film 6 can be etched with a known etchant according to the wet etching. Subsequently, a center portion of the ohmic contact film 5 of the TFT portion is etched and removed to expose the semiconductor active film 4 as shown in FIG. 7C.

In the next place, the second insulating film 7 is deposited by means of the plasma CVD or the like. The second insulating film 7 can be formed from a material same as that of the first insulating film 3, and a film thickness thereof is preferably determined in consideration of the coverage of a lower layer pattern. In the embodiment, as the second insulating film 7, a SiN film having a film thickness of 300 nm is deposited.

Then, in a fourth photoengraving step, the second insulating film 7 and the first insulating film 3 are patterned to form a contact hole 82 on the gate terminal 23, a contact hole 83 on the source terminal 64 and a contact hole 84 on the covering potion 71 on the reflective pixel electrode 65. In the embodiment 3, particularly on the second insulating film 7, the covering portion 71 that covers the reflective pixel electrode 65 is left and the contact hole 84 is formed partially in the covering portion 71. The first insulating film 3 and the second insulating film 7 on the gate terminal 23 are etched at one time to form a contact hole 82. Furthermore, in the etching of the second insulating film 7 and the first insulating film 3, in order to improve the coverage of the conductive thin film in the contact holes, taper etching is preferably applied.

Subsequently, of the second conductive film 6 exposed by the contact holes 83 and 84, only an AlCu film that is the second layer 6b and an upper layer thereof is etched and removed (FIG. 7D). At this time, in bottom portions of the contact holes 83 and 84, a Cr film that is the first layer 6a of the second conductive film 6 is exposed.

In the next place, a transparent conductive film 9 is deposited by means of the sputtering or the like. As the transparent conductive film 9, ITO, $SnO_2$ and so on can be used. From the viewpoint of the chemical stability in particular, the ITO is preferably used. In the embodiment, as the transparent conductive film 9, a-ITO having a film thickness of 100 nm is deposited.

Then, in a fifth photoengraving step, the transparent conductive film 9 is patterned to form, as shown in FIG. 7E, a transmissive pixel electrode 91 and terminal patterns 92 and 93. At this time, the insides of the contact holes 82, 83, and 84 are covered as well with the transparent conductive film 9. Furthermore, at bottom portions of the contact holes 83 and 84 Cr that is the first layer 6a that is a lower layer of the second conductive film 6 is exposed and Cr is hardly surface oxidized even when it is exposed to the sputtering atmosphere; accordingly, through the contact hole 83 between the source terminal 64 and the terminal pattern 92, and through the contact hole 84 between the reflective pixel electrode 65 and the transmissive pixel electrode 91, excellent contact resistance can be obtained, and the transmissive pixel electrode 91 is electrically connected through the reflective pixel electrode 65 with the drain electrode 62. Hereinafter, according to the process similar to that of the embodiment 1, a semi-transmissive liquid crystal display device is formed.

In general, in a semi-transmissive liquid crystal display device, in order to approximate optical paths of a reflective pixel electrode portion that reflects light to display and a transmissive pixel electrode portion that transmits light to display to make the optical characteristics identical, a cell gap of the reflective pixel electrode is necessarily made smaller. As a result, there is a problem in that the short-circuiting occurs between planes (between the reflective pixel electrode of the TFT array substrate and the opposite transparent electrode of the opposite substrate) and thereby the yield is deteriorated. According to the embodiment 3, when the second insulating film 7 is left on the reflective pixel electrode 65, the short-circuiting between the reflective pixel electrode 65 and the opposite transparent electrode can be inhibited from occurring.

As mentioned above, in the embodiment 3 as well, similarly to the embodiment 1, when a configuration in which the reflective pixel electrode 65 is constituted of the second conductive film 6 that constitutes the source electrode 61, drain electrode 62, source wiring 63 and the like and that does not use the interlayer insulating film that is made of an organic resin film high in the material cost is adopted, a manufacturing cost of the semi-transmissive liquid crystal display device can be reduced. Furthermore, when, at a connection portion of the second conductive film (such as reflective pixel electrode 65) 6 and the transparent conductive film (such as transmissive pixel electrode 91) 9, the second layer 6b that is an upper layer of the second conductive film 6 is partially removed and the first layer (Cr) 6a that is a lower layer is used to connect with the transparent conductive film 9, also in a layer constitution in which after the formation of the reflective pixel electrode 65 the transmissive pixel electrode 91 is formed, the connection portion between the reflective pixel electrode 65 and the transmissive pixel electrode 91 can obtain excellent contact resistance.

Furthermore, when the second insulating film 7 is left on the reflective pixel electrode 65, without adding a process, the short-circuiting between the reflective pixel electrode 65 and the opposite transparent electrode can be inhibited from occurring, resulting in an improvement in the yield of the semi-transmissive liquid crystal display device.

In the embodiment 3, a case where at a connection portion of the second conductive film (such as reflective pixel electrode 65) 6 and the transparent conductive film (such as transmissive pixel electrode 91) 9, the second layer 6b that is an upper layer of the second conductive film 6 is partially removed and the first layer 6a that is a lower layer is used to electrically connect with the transparent conductive film 9 is shown. However, even when a constitution in which, as shown in the embodiment 1, a second conductive film 6 in which on the second layer 6b, as a third layer 6c at the uppermost, a metal thin film that is hardly surface oxidized even when it is exposed to the sputtering atmosphere is disposed, the third layer 6c of the second conductive film 6 is not partially removed, and the second conductive film 6 and the transparent conductive film 9 are connected is adopted, effects similar to the embodiment 3 can be obtained.

Embodiment 4

Figure 8:
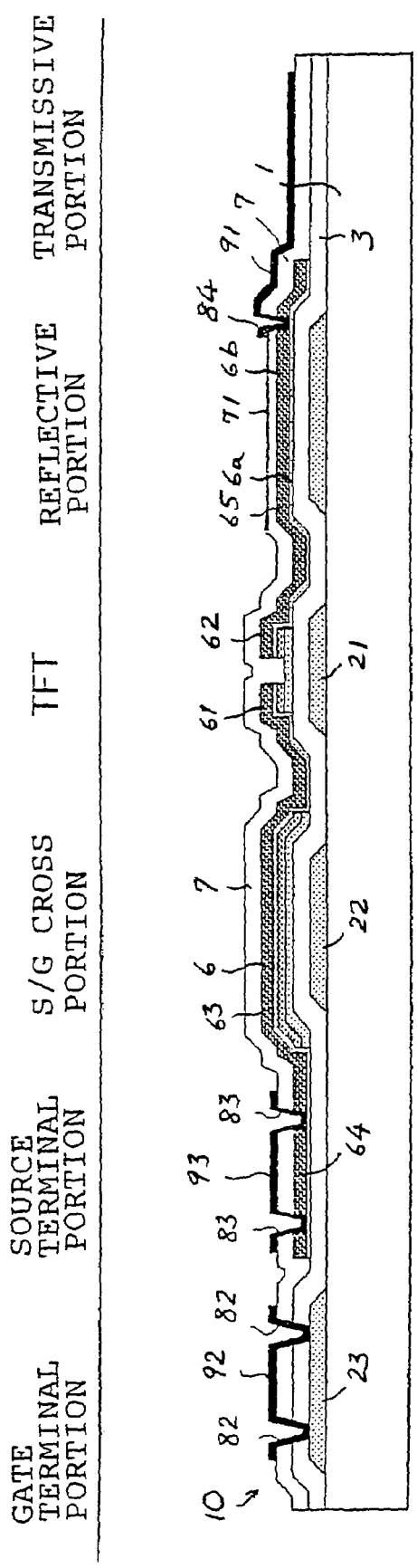
FIG. 8 is a sectional view showing a TFT array substrate that constitutes a semi-transmissive liquid crystal display device in embodiment 4 according to the invention.

FIG. 8 is a sectional view showing a TFT array substrate constituting a semi-transmissive liquid crystal display device in embodiment 4 according to the present invention. In the drawing, the same and corresponding portions are given the same reference numerals.

A structure and a manufacturing process of a semi-transmissive liquid crystal display device in the embodiment 4, except for a manufacturing process of a second insulating film 7 formed on a TFT array substrate, are same as those of the embodiment 3; accordingly, explanations thereof will be omitted.

A TFT array substrate 10 in the embodiment 4 is provided with, similarly to the embodiment 3, on a transparent insulating substrate 1, a gate electrode 21 and a gate wiring 22 and a gate terminal 23 and auxiliary capacitance electrode and auxiliary capacitance wiring 24 that are all made of a first metal film, a first insulating film 3, a semiconductor active film 4, an ohmic contact film 5, a source electrode 61 and a drain electrode 62 and a source wiring 63 and a source terminal 64 and a reflective pixel electrode 65 that are all formed from a second conductive film 6; a contact hole 82 on a second insulating film 7 and the gate terminal 23; on the source terminal 64, a contact hole 83; on the reflective pixel electrode 65, a contact hole 84, terminal patterns 92, 93 and a transmissive pixel electrode 91. However, in the embodiment 4, as shown in FIG. 8, a covering portion 71 of the second insulating film 7 on the reflective pixel electrode 65 is made thinner than other portion in the film thickness.

In the next place, a manufacturing process of a semi-transmissive liquid crystal display device in the embodiment 4 will be explained. Processes other than a manufacturing process of a second insulating film 7 are same as those of the embodiment 3; accordingly, explanations thereof will be omitted.

According to a process similar to the embodiment 3, on a transparent insulating substrate 1, a gate electrode 21 and a gate wiring 22 and a gate terminal 23 and auxiliary capacitance electrode and auxiliary capacitance wiring 24 that are all made of the first metal film, a first insulating film 3, a semiconductor active film 4, an ohmic contact film 5, and a source electrode 61 and a drain electrode 62 and a source wiring 63 and a source terminal 64 and the reflective pixel electrode 65 that are all made of the second conductive film 6 are formed.

In the next place, by means of the plasma CVD method or the like, the second insulating film 7 is deposited. The second insulating film 7 can be formed with a material same as that of the first insulating film 3, and a film thickness thereof is preferably determined in consideration of the coverage of a lower layer pattern. In the embodiment 4, as the second insulating film 7, a SiN film having a film thickness of 300 nm is deposited. Subsequently, in a fourth photoengraving process, the second insulating film 7 is patterned. At this time, a half-tone exposure process is used.

Now, the half-tone exposure process will be described. In the half-tone exposure, through a half-tone mask, for instance, a mask having the shading in a Cr pattern of the mask, exposure is carried out, and thereby the exposure intensity is adjusted to control a remaining film thickness of a photoresist. Thereafter, firstly, a film in a portion where the photoresist is completely removed is etched. Then, the photoresist is subjected to the ashing, and thereby the photoresist of a portion small in the remaining film thickness is removed. Then, in a portion where the remaining film thickness of the photoresist is small (photoresist is removed), the film is etched. Thereby, a film thickness of a film that is formed by one-time photoengraving process can be varied.

When the second insulating film 7 is patterned owing to a fourth photoengraving process, firstly, exposure is carried out with the half-tone mask, and thereby the photoresist is formed in a covering portion 71 on the reflective pixel electrode 65 with a remaining film thickness smaller than that of other portion where the second insulating film 7 is left. Then, the second insulating film 7 and the first insulating film 3 are etched by means of the dry etching to form contact holes 82, 83 and 84. Subsequently, the photoresist is subjected to the ashing with oxygen plasma to remove the photoresist on the reflective pixel electrode 65, and thereby the second insulating film 7 is exposed. Thereafter, the second insulating film 7 is once more etched. At this time, the etching conditions are controlled and thereby a film thickness of the covering portion 71 of the second insulating film 7 left on the reflective pixel electrode 65 is controlled. When the second insulating film is dry etched, etching, ashing and etching can be successively carried out. After that, according to a process similar to the embodiment 3, a semi-transmissive liquid crystal display device is formed.

As mentioned above, according to the embodiment 4, effects similar to that of the embodiment 3 can be obtained and when the remaining film thickness of the covering portion 71 of the second insulating film 7 on the reflective pixel electrode 65 is made thinner, in comparison with the embodiment 3, the reflectance characteristics in the reflective pixel electrode 65 can be improved.

Embodiment 5

FIGS. 9A through 9E are sectional views showing a flow of a manufacturing process of a TFT array substrate constituting a semi-transmissive liquid crystal display device in embodiment 5 according to the invention. In the drawing, the same and corresponding portions are given the same reference numerals.

A structure of the semi-transmissive liquid crystal display device in the embodiment is similar to that of the embodiment 1; accordingly, explanations thereof will be omitted. In the next place, a manufacturing process of the semi-transmissive liquid crystal display device in the embodiment will be explained with reference to FIGS. 9A through 9E.

Figure 9:
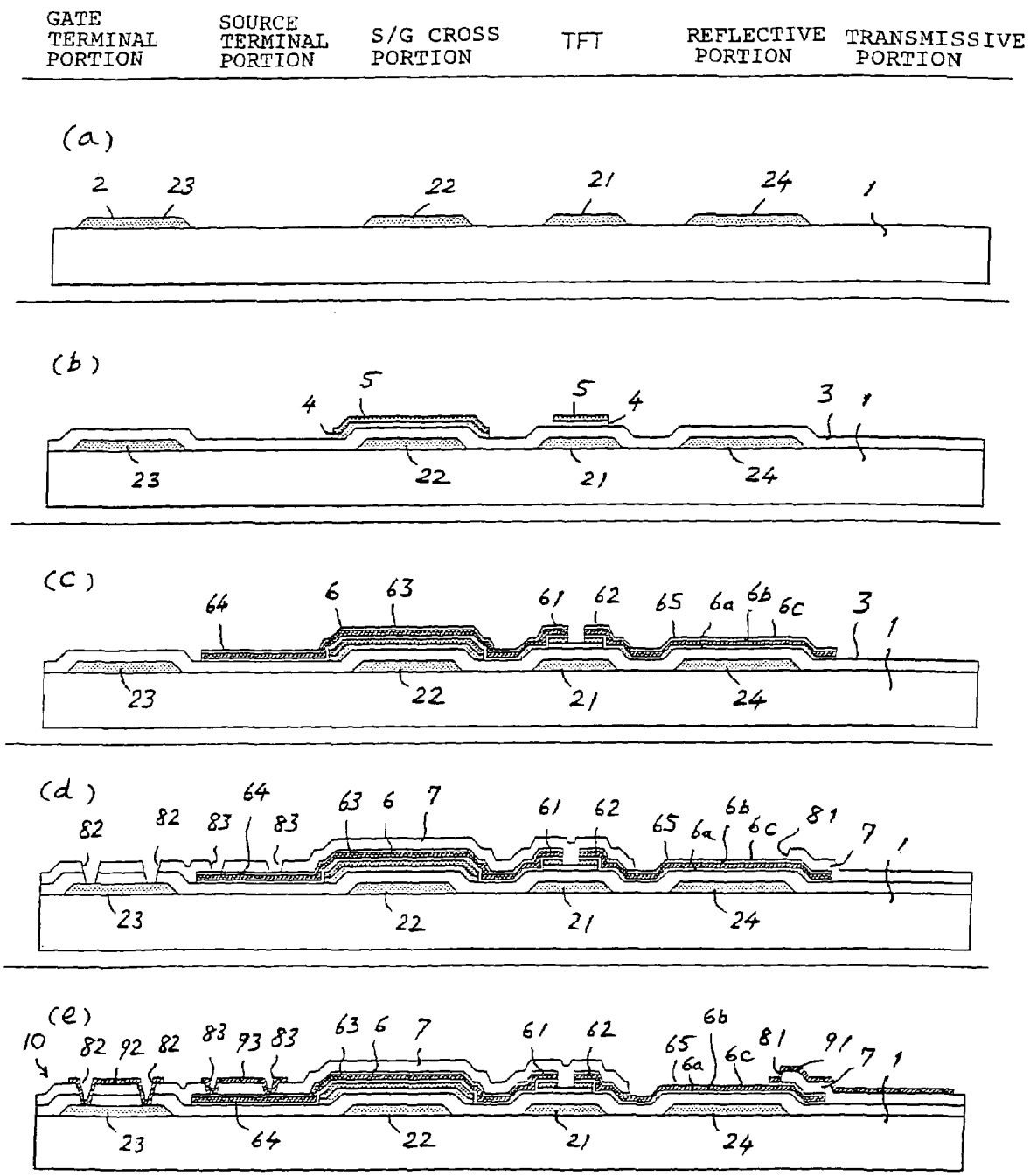
FIGS. 9A through 9E are sectional views showing a manufacturing process flow of a TFT array substrate that constitutes a semi-transmissive liquid crystal display device in embodiment 5 according to the invention.

Firstly, on a transparent insulating substrate 1, a first conductive film 2 is deposited, followed by patterning by means of a first photoengraving process to form a gate terminal 23, a gate wiring 22, a gate electrode 21, and auxiliary capacitance electrode and auxiliary capacitance wiring 24 (FIG. 9A). Film compositions and manufacturing processes of the gate electrode 21, the gate wiring 22, the gate terminal 23, and the auxiliary capacitance electrode and auxiliary capacitance wiring 24 are similar to those of the embodiment 1; accordingly, explanations thereof will be omitted.

In the next place, a first insulating film 3, a semiconductor active film 4, and an ohmic contact film 5 are successively deposited, followed by patterning the semiconductor active film 4 and the ohmic contact film 5 in the second photoengraving step (FIG. 9B). Film compositions and manufacturing processes of the first insulating film 3, the semiconductor active film 4, and the ohmic contact film 5 are similar to those of the embodiment 1; accordingly, explanations thereof will be omitted.

Subsequently, by use of the sputtering method or the like, the second conductive film 6 is deposited. As the second conductive film 6, a thin film having a three-layered structure in which, for instance, a first layer 6a that is a lower layer is formed from chromium, molybdenum, tantalum, titanium or an alloy mainly made of at least these one, a second layer 6b that is an intermediate layer is formed of aluminum, silver (Ag) or an alloy mainly made of at least these one, and a third layer 6c that is the uppermost layer is formed from chromium, molybdenum, tantalum, titanium or an alloy mainly made of at least these one can be used. In the embodiment 5, as the second conductive film 6, the first layer 6a is deposited as a chromium film having a film thickness of 100 nm; the second layer 6b, an AlCu film having a film thickness of 100 nm; and the third layer 6c, a Cr film having a film thickness of 10 nm.

The first layer 6a that is a lower layer of the second conductive film 6 is disposed to improve the adhesiveness with a third insulating film 3. Furthermore, the second conductive film 6 is exposed to the sputtering atmosphere in a transparent conductive film formation process described later; accordingly, by employing, as the third layer 6c that is the uppermost layer of the second conductive film 6, a conductive metal thin film that is hardly surface oxidized even when it is exposed to the sputtering atmosphere is used, the contact resistance between the second conductive film 6 and a transparent conductive film 9 is inhibited from going up.

In the next place, in a third photoengraving step, the second conductive film 6 is patterned to form a source terminal 64, a source wiring 63, a source electrode 61, a drain electrode 62 and a reflective pixel electrode 65. At that time, the drain electrode 62 and the reflective pixel electrode 65 are continuously formed in the same layer, that is, the drain electrode 62 and the reflective pixel electrode 65 are electrically connected in the same layer. The second conductive film 6 can be etched with a known etchant according to the wet etching. Subsequently, a center portion of the ohmic contact film 5 of the TFT portion is etched and removed to expose the semiconductor active film 4 as shown in FIG. 9C.

In the next place, the second insulating film 7 is deposited by means of the plasma CVD or the like. The second insulating film 7 can be formed from a material same as that of the first insulating film 3, and a film thickness thereof is preferably determined in consideration of the coverage of a lower layer pattern. In the embodiment, as the second insulating film 7, a SiN film having a film thickness of 400 nm is deposited.

Then, in a fourth photoengraving step, the second insulating film 7 and the first insulating film 3 are patterned to form, as shown in FIG. 9D, an opening 81 on the reflective pixel electrode 65, a contact hole 82 on the gate terminal 23, and a contact hole 83 on the source terminal 64. The first insulating film 3 and the second insulating film 7 on the gate terminal 23 are etched at one time to form the contact hole 82. Furthermore, in the etching of the second insulating film 7 and the first insulating film 3, in order to improve the coverage of the conductive thin film in the contact hole, the taper etching is preferably applied.

In the next place, a transparent conductive film is deposited by means of the sputtering or the like. As the transparent conductive film, ITO, $SnO_2$ and so on can be used. From the viewpoint of the chemical stability in particular, the ITO is preferably used. In the embodiment, as the transparent conductive film, a-ITO having a film thickness of 80 nm is deposited.

Then, in a fifth photoengraving step, the transparent film is patterned to form a transmissive pixel electrode 91 and terminal patterns 92 and 93. At this time, the insides of the contact holes 82 and 83 and sidewall portions of the opening 81 that corresponds to a connection portion between the reflective pixel electrode 65 and the transmissive pixel electrode 91 are covered with a transparent insulating film. Furthermore, by employing, as the third layer 6c that is the uppermost layer of the second conductive film 6 that constitutes the reflective pixel electrode 65 and so on, Cr or the like that is hardly surface oxidized even when it is exposed to the sputtering atmosphere, excellent contact resistance between the reflective pixel electrode 65 and the transmissive pixel electrode 91 can be obtained, and thereby the transmissive pixel electrode 91 is electrically connected through the reflective pixel electrode 65 to the drain electrode 62.

In the next place, on the reflective pixel electrode 65, Cr that is the third layer 6c at the uppermost of the second conductive film 6 exposed from the opening 81 formed in the second insulating film 7 is etched and removed (FIG. 9E). Thereby, on a surface of the reflective pixel electrode 65, an AlCu alloy film high in the reflectance is exposed and thereby excellent reflectance characteristics can be obtained. Thereafter, a semi-transmissive liquid crystal display device is formed according to a process same as that of the embodiment 1.

As mentioned above, in the embodiment 5 as well, similarly to the embodiment 1, when a constitution in which the reflective pixel electrode 65 is formed from the second conductive film 6 that constitutes the source electrode 61, the drain electrode 62, the source wiring 63 and so on and that does not use an interlayer insulating film made of an organic resin film expensive in the material cost is adopted, the manufacturing cost of the semi-transmissive liquid crystal display device can be reduced.

Furthermore, when, as the third layer 6c at the uppermost of the second conductive film 6 that constitutes the reflective pixel electrode 65, Cr or the like that is hardly surface oxidized even when it is exposed to the sputtering atmosphere is used, and the third layer 6c is removed in the last step, also in a layer structure in which after the formation of the reflective pixel electrode 65 the transmissive pixel electrode 91 is formed, a connection portion between the reflective pixel electrode 65 and the transmissive pixel electrode 91 can obtain excellent contact resistance and an AlCu alloy film high in the reflectance is exposed on a surface of the reflective pixel electrode 65; accordingly, excellent reflectance characteristics can be obtained.

The present invention can be applied to liquid crystal display devices and, in particular in a circumstance where lower consumption power is demanded, can be used as monitors for small size portable information devices.

What is claimed is:

1. A semi-transmissive liquid crystal display device comprising a liquid crystal disposed between a TFT array substrate having, in one pixel, a light transmissive pixel electrode that is disposed to transmit light to the liquid crystal and a light reflective pixel electrode that is disposed to reflect light to the liquid crystal and an opposite substrate having an opposite transparent electrode, wherein the TFT array substrate comprises:
    a gate wiring that is made of a first conductive film formed on a transparent insulating substrate and includes a gate electrode;
    a first insulating film formed on the first conductive film;
    a semiconductor layer formed on the first insulating film and opposed to the gate electrode;
    a source wiring made of a second conductive film that is formed on the first insulating film and intersects with the gate wiring and has a source electrode disposed on the semiconductor layer;
    a drain electrode made of the second conductive film and disposed on the semiconductor layer;
    a thin film transistor that is formed of the gate electrode, the semiconductor layer, the source electrode, and the drain electrode; and
    a second insulating film formed on the first insulating film, the source wiring, and the thin film transistor,
    wherein the reflective pixel electrode is formed from the second conductive film and extends from the drain electrode,
    the second insulating film has an opening on the reflective pixel electrode, the opening delimiting a portion of the reflective pixel electrode located at a far side from the drain electrode
    the transmissive pixel electrode is disposed on the transparent insulating substrate so as to be aligned with the reflective pixel electrode and is positioned at a farther side than the reflective pixel electrode from the drain electrode, and
    the transmissive pixel electrode is electrically connected with the portion of the reflective pixel electrode through the opening of the second insulating film, the opening delimiting the transmissive pixel electrode.

2. The semi-transmissive liquid crystal display device according to claim 1, wherein the opening exposes, except for a region that contributes to electrical connection with the transmissive pixel electrode, almost all surface of the reflective pixel electrode on a surface of the TFT array substrate.

3. The semi-transmissive liquid crystal display device according to claim 2, wherein the reflective pixel electrode, in a region that contributes to an electrical connection with the transmissive pixel electrode, has a three-layered structure where a first layer is made of selected one from a group consisting of Cr, Mo, Ti, Ta and an alloy mainly made of at least these one, a second layer is made of selected one from a group consisting of Al, Ag and an alloy mainly made of at least these one and a third layer is made of selected one from the group consisting of Cr, Mo, Ti, Ta and an alloy mainly made of at least these one; and in a region exposed on a surface of the TFT array substrate owing to the opening formed in the second insulating film, the reflective pixel electrode has a two-layered structure in which the third layer is removed and the second layer is exposed.

4. The semi-transmissive liquid crystal display device according to claim 1, wherein the opening is covered with a covering portion that is formed on almost whole surface of the reflective pixel electrode and made of a transparent conductive film same as that of the transmissive pixel electrode.

5. The semi-transmissive liquid crystal display device according to claim 1, wherein almost all surface of the reflective pixel electrode except for the portion of the reflective pixel electrode is covered with a covering portion of the second insulating film.

6. The semi-transmissive liquid crystal display device according to claim 5, wherein the reflective pixel electrode is formed into a two-layered structure in which a first layer is formed of a selected one from a group consisting of Cr, Mo, Ti, Ta and an alloy mainly made of at least one of these materials and a second layer is formed of a selected one from a group consisting of Al, Ag and an alloy mainly made of at least one of these materials, and on the portion of the reflective pixel electrode, the second layer is partially removed, and the electrical connection therebetween is established through the first layer of the reflective pixel electrode.

7. The semi-transmissive liquid crystal display device according to claim 5, wherein the covering portion of the second insulating film is formed with a film thickness thinner than that of other portions of the second insulating film.

8. The semi-transmissive liquid crystal display device according to claim 1, wherein the reflective pixel electrode, at least a surface layer thereof, is constituted of a selected one from a group consisting of Al, Ag and an alloy mainly made of at least one of these materials high in reflectance.

9. The semi-transmissive liquid crystal display device according to claim 1, wherein the reflective pixel electrode, at least a surface layer thereof, is constituted of a nitride film of selected one from a group consisting of Al, Ag and an alloy mainly made of at least these one.

10. The semi-transmissive liquid crystal display device according to claim 1, wherein the second conductive film has multiple layers, the source electrode and the drain electrode are formed by said multiple layers, and the reflective pixel electrode is formed by at least some of said multiple layers.

11. The semi-transmissive liquid crystal display device according to claim 10, wherein the multiple layers are formed by a first layer, a second layer disposed on the first layer, and a third layer disposed on the second layer, and the source electrode, the drain electrode, and the reflective pixel electrode are formed by the first, second, and third layers.

12. The semi-transmissive liquid crystal display device according to claim 10, wherein the multiple layers are formed by a first layer, and a second layer disposed on the first layer, and the source electrode, the drain electrode, and the reflective pixel electrode are formed by the first and second layers.

13. The semi-transmissive liquid crystal display device according to claim 10, wherein the multiple layers are formed by a first layer, a second layer disposed on the first layer and a third layer disposed on the second layer, the source electrode and drain electrode are formed by the first, second, and third layers, and the reflective pixel electrode is formed by the first and second layers at an exposed area in an opening formed in the third layer.

14. A semi-transmissive liquid crystal display device comprising a liquid crystal disposed between a TFT array substrate having, in one pixel, a light transmissive pixel electrode that is disposed to transmit light to the liquid crystal and a light reflective pixel electrode that is disposed to reflect light to the liquid crystal and an opposite substrate having an opposite transparent electrode, wherein the TFT array substrate comprises:

a gate wiring that is made of a first conductive film formed on a transparent insulating substrate and includes a gate electrode;

a first insulating film formed on the first conductive film;

a semiconductor layer formed on the first insulating film and opposed to the gate electrode;

a source wiring made of a second conductive film that is formed on the first insulating film and intersects with the gate wiring and has a source electrode disposed on the semiconductor layer;

a drain electrode made of the second conductive film and disposed on the semiconductor layer;

a thin film transistor that is formed of the gate electrode, the semiconductor layer, the source electrode, and the drain electrode; and a second insulating film formed on the first insulating film, the source wiring, and the thin film transistor, wherein the reflective pixel electrode is formed from the second conductive film and extends from the drain electrode, the second insulating film has an opening on the reflective pixel electrode, at a far side from the drain electrode, the opening overlapping at least a portion of the reflective pixel electrode, the transmissive pixel electrode is disposed on the transparent insulating substrate so as to be aligned with the reflective pixel electrode and to be positioned at a farther side than the reflective pixel electrode from the drain electrode, the transmissive pixel electrode is only electrically connected with the overlapped portion of the reflective pixel electrode through the opening of the second insulating film, almost all of a surface of the reflective pixel electrode, except for the portion of the reflective pixel electrode is covered with a covering portion of the second insulating film, the reflective pixel electrode is formed into a two-layered structure in which a first layer is formed of a selected one from a group consisting of Cr, Mo, Ti, Ta and an alloy mainly made of at least one of these materials and a second layer is formed of a selected one from a group consisting of Al, Ag and an alloy mainly made of at least one of these materials, and on the overlapped portion of the reflective pixel electrode, the second layer is partially removed, and the electrical connection therebetween is established through the first layer of the reflective pixel electrode.

* * * * *